US008512647B2

(12) United States Patent
Telimaa et al.

(10) Patent No.: US 8,512,647 B2
(45) Date of Patent: Aug. 20, 2013

(54) SUPPORT PIPETTE

(75) Inventors: Juha Telimaa, Järvenpää (FI); Mikael Lind, Helsinki (FI)

(73) Assignee: Thermo Fisher Scientific Oy, Vantaa (FI)

( * ) Notice: Subject to any disclaimer, the term of this patent is extended or adjusted under 35 U.S.C. 154(b) by 0 days.

(21) Appl. No.: 13/292,397

(22) Filed: Nov. 9, 2011

(65) Prior Publication Data

US 2012/0201722 A1 Aug. 9, 2012

(30) Foreign Application Priority Data

Nov. 11, 2010 (FI) ..................................... 20106185

(51) Int. Cl.

*B01L 3/00* (2006.01)
*G01F 19/00* (2006.01)
*B01L 3/02* (2006.01)

(52) U.S. Cl.

USPC .......................... 422/501; 73/1.74; 73/864.01

(58) Field of Classification Search

USPC ........................................................ 422/501
See application file for complete search history.

(56) References Cited

U.S. PATENT DOCUMENTS

| | | | | |
|---|---|---|---|---|
| 3,827,305 | A | 8/1974 | Gilson et al. | |
| 3,834,240 | A * | 9/1974 | Kenney | 73/864.15 |
| 5,770,159 | A * | 6/1998 | Marteau D'Autry | 422/515 |
| 5,804,144 | A | 9/1998 | Tervamaki | |
| 2001/0005490 | A1 | 6/2001 | Kohrmann et al. | |
| 2002/0012613 | A1 | 1/2002 | Scordato et al. | |

FOREIGN PATENT DOCUMENTS

JP 3-186353 8/1991

OTHER PUBLICATIONS

Search Report for FI 20106185, dated Jun. 23, 2011.
Capp ApS, XP002693658, Web site, Sep. 13, 2010.
USA Scientific, Manual ErgoOne Pipette, Web site, Dec. 1, 2009.
EP Search Report, Appl. No. EP 11 18 8207 (Apr. 8, 2013).

* cited by examiner

*Primary Examiner* — Jill Warden
*Assistant Examiner* — Brittany Fisher
(74) *Attorney, Agent, or Firm* — Nixon & Vanderhye P.C.

(57) ABSTRACT

A support pipette including at least one cylinder with an upper end and a lower end, each cylinder having a movable piston, and an elongate handle (1) with an upper part and a lower part, at which handle the pipette can be manually gripped, wherein the lower part (13.1; 13.2; 13.3) of the handle (1) includes a sideways protruding lower support (10.1; 10.2; 10.3; 10.4; 10.5).

10 Claims, 4 Drawing Sheets

SUPPORT PIPETTE

This application claims priority to FI Patent Application No. 20106185 filed 11 Nov. 2010, the entire contents of which is hereby incorporated by reference.

FIELD OF INVENTION

The invention relates to the dispensing of liquids and to a pipette with an elongate handle for gripping.

PRIOR ART

For dispensing liquids, there are used pipettes with a piston, by means of which liquid is absorbed in a pipette tip to be attached to a suction channel, and removed from said pipette tip. The pipette is provided with an elongate handle, by which the pipette can be gripped with a palm grip. The upper part of the handle is provided with a sideways extending finger support, offering a rest for the index finger, that improves the manual grip of the pipette. At the outer end, the finger support is slightly downwardly curved. Attempts for improving the tactile properties of pipettes have been realized by improving the handle design. In the prior art, there have also been used handles that are substantially universally thick, downwardly narrowing or roundish. From the Finnish patent publication FI 20012251, there also is known a pipette with a handle part that can be shaped by the user and even replaced with another one.

GENERAL DESCRIPTION OF INVENTION

An invention according to the appended claims has now been made.

The pipette according to the invention is provided with a lower support at the lower part of the handle. It prevents the hand from sliding downwardly on the handle. Thus there is no need to grip the pipette as hard as with conventional pipettes, for example when a pipette tip is being placed at the tip. In this connection, the lower part of the handle refers to the part that is placed substantially in the area of the lower edge of the user's palm or the lowest finger.

The lower support is formed in the lower part of the handle, as a sideways extending protrusion, which protrusion is advantageously extended essentially radially with respect to the central axis of the pipette, but only in part of the cross-sectional area of the pipette at the location of the lower support. The lower support is advantageously extended for 3-8 mm from the surface level of the handle.

Preferably the top part of the handle also includes a finger support. The finger support is advantageously located on the same side of the handle as the lower support, most preferably so that the same plane, transversal to the handle, intersects both supports.

The lower support may be vertically movable and locked at a desired height within the limits of the motion tolerance. Thus the user may set the lower support at a location that is optimally suitable for his/her hand. The lower support may also be rotary with respect to the handle, and locked at a desired spot within the limits of the rotation tolerance. Thus the user may set the lower support at an optimal location with respect to the shape of his/her hand or his/her individual pipetting grip. In the center position, a rotary lower support is positioned at the same location as the finger support. From the center position, the lower support can be rotary in both directions, for example for 45-60 degrees.

When necessary, a pipette according to the invention may also be provided with a support section connecting the outer end of the finger support and the outer end of the lower support, so that in cross-section, the support structure of the pipette forms a closed shape.

DRAWINGS

The appended drawings belong to the written specification of the invention, and constitute an inseparable part of the detailed description of a few preferred embodiments of the invention, to be given below. In the drawings.

DETAILED DESCRIPTION OF PREFERRED EMBODIMENTS

Figure 1:
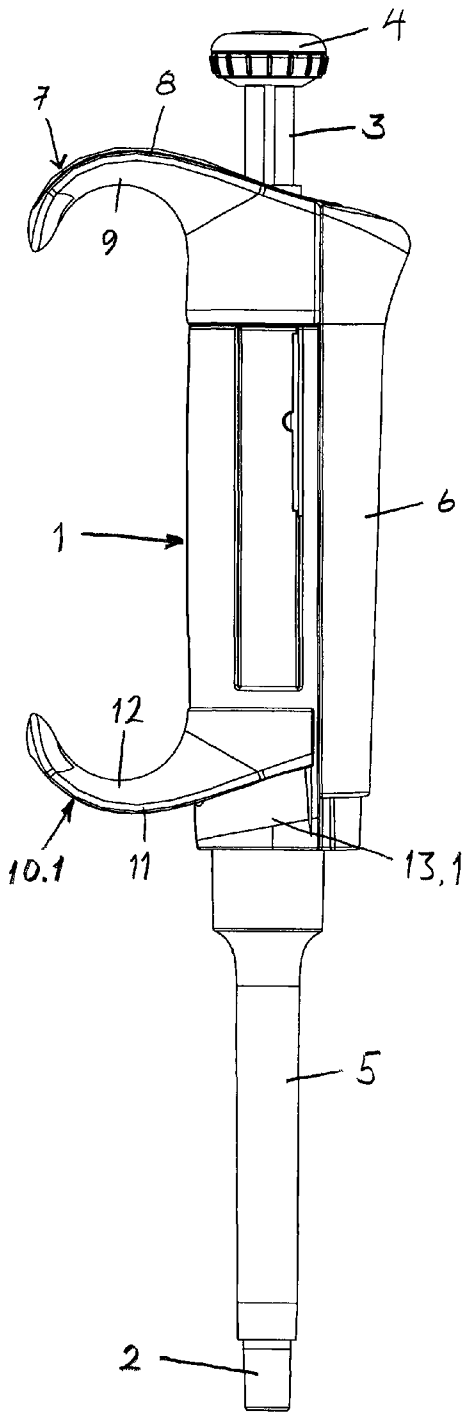
FIG. 1 illustrates a pipette with a fixed hook-like lower support.

The pipette illustrated in the drawings includes a cylinder with a movable piston therein. These are fitted in an elongate body formed by a handle 1 and a tip part 2 placed at the lower end of the handle. At the end of the tip part, there is attached a pipette tip in which the liquid to be dispensed is sucked. As an extension of the piston, there is arranged a shaft 3 that is projected out of a hole provided at the upper end of the handle. The end of the shaft includes a button 4.

Pipettes are provided with a volume adjustment mechanism where the dispensing volume is set by winding the shaft 3 at the button 4. The set volume can be presented for example by means of numeral rings in a window arranged in the handle. This kind of mechanism is described for example in the publication WO 2005/050554. The button is preferably of a type having in the lengthwise direction of the shaft a lower position where the shaft is not rotated along with the button, and an upper position where the shaft is rotated along with the button. This is a way to try and prevent any accidental change in the volume settings. This kind of mechanism is described for example in the publication WO 2009/118456.

On top of the tip part 2, there is arranged a tip ejector sleeve 5. As an extension of the top part of said sleeve 5, at the side of the handle 1, there is arranged a spring loaded press button 6, which can be pressed down against the spring force, so that the sleeve pushes the pipette tip placed at the end of the tip part, thus detaching it. The force needed for detaching can be reduced by a lever mechanism, for example by means of a wheel moving in between the press button and the handle. This kind of mechanism is described for example in the publication WO 556939.

At the upper end of the handle 1, at the side thereof, there is provided a downwardly curved finger support 7, including a body part 8 and a contact element 9 located under the body part, to be rested against the finger. Generally the parts 8 and 9 of the finger support 7 are rigid elements, but when necessary, the contact element 9 to be placed against the finger can be realized as a softer and more elastic piece or section.

Figure 2:
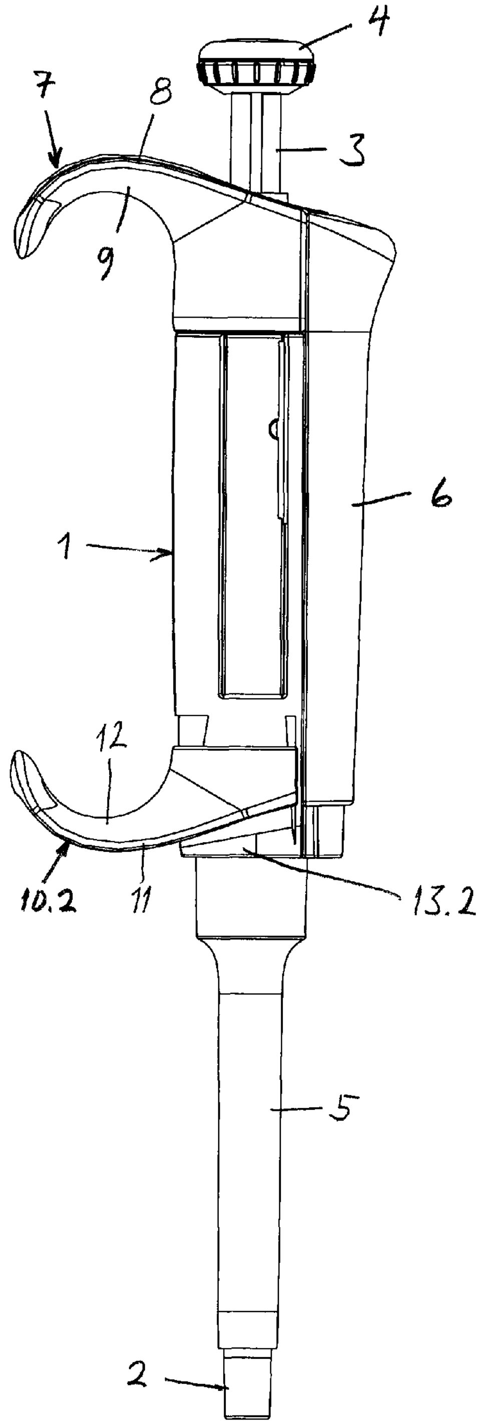
FIG. 2 illustrates a pipette with a vertically movable hook-like lower support.
Figure 3:
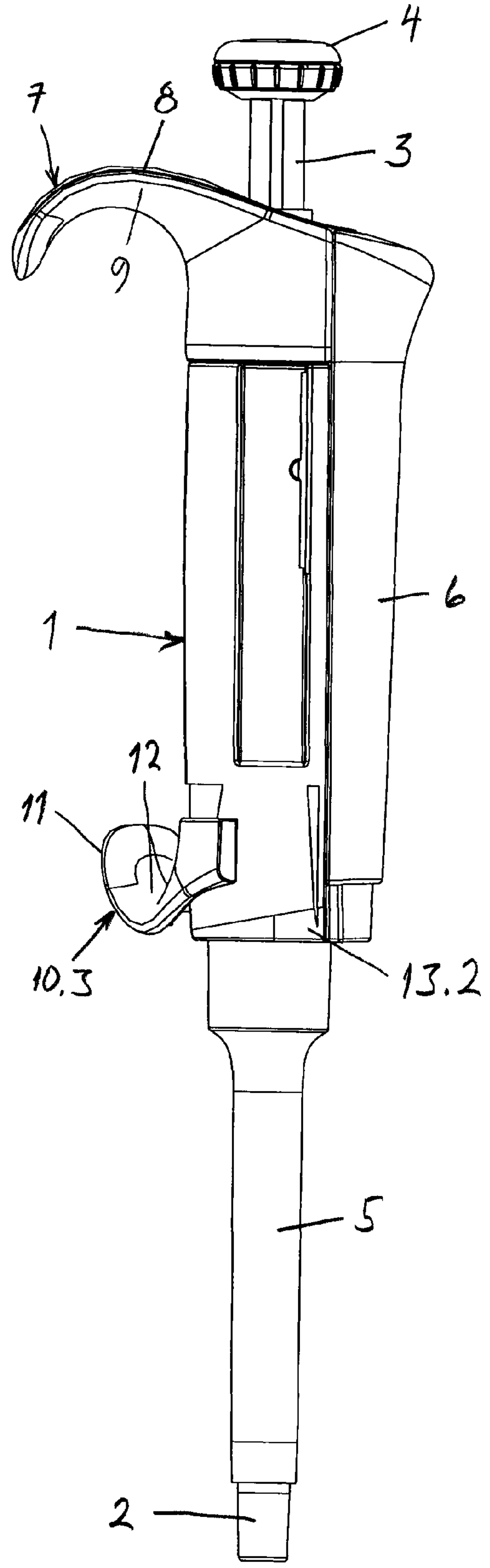
FIG. 3 illustrates a pipette with a vertically movable, rotary hook-like lower support.

The lower part of the handle 1 is, at the side of the handle, provided with a lower support 10.1 (FIG. 1), 10.2 (FIG. 2) or 10.3 (FIG. 3). In the embodiment of FIGS. 1-3, the lower support is upwardly curved. It includes a rigid lower body part 11 underneath and a softer upper contact element 12 on top. The lower support supports the hand that grips the handle. Thus the pipette is held in the hand by a smaller pressing force.

In the pipette described in FIG. 1, the lower support 10.1 is fixedly attached to the lower part 13 of the handle, on the side of the handle, at the same location as the finger support 7.

In the pipette described in FIG. 2, the lower support 10.2 is attached to the lower part 13.2 of the handle, to be movable in the lengthwise direction of the handle, so that the lower support can be locked at a certain height. Thus the location of the lower support can be adjusted according to the size of the user's hand. In an embodiment according to the invention, the adjustability of the location of the lower support can be realized for example by an arrangement based on gearing, or by a retainer screw type arrangement. Also in this embodiment, the lower support is attached at the same point as the finger support 7. The distance between the finger support 7 and the lower support, together with a possible adjusting tolerance, is typically 70-100 mm.

In a pipette according to FIG. 3, the lower support 10.3 is attached to the lower part 13.3 of the handle both to be movable in the lengthwise direction and to be rotary around the lower part, so that the lower support can be locked both at a certain height and at a certain angle with respect to the finger support 7, for example by intermediation of a retainer screw (not illustrated). Thus the location of the lower support can be adjusted according to the size and shape of the user's hand, and also according to the user's preferences. The adjusting tolerance of the lower support is about 60 degrees in both directions in the vicinity of the finger support 7.

Figure 4:
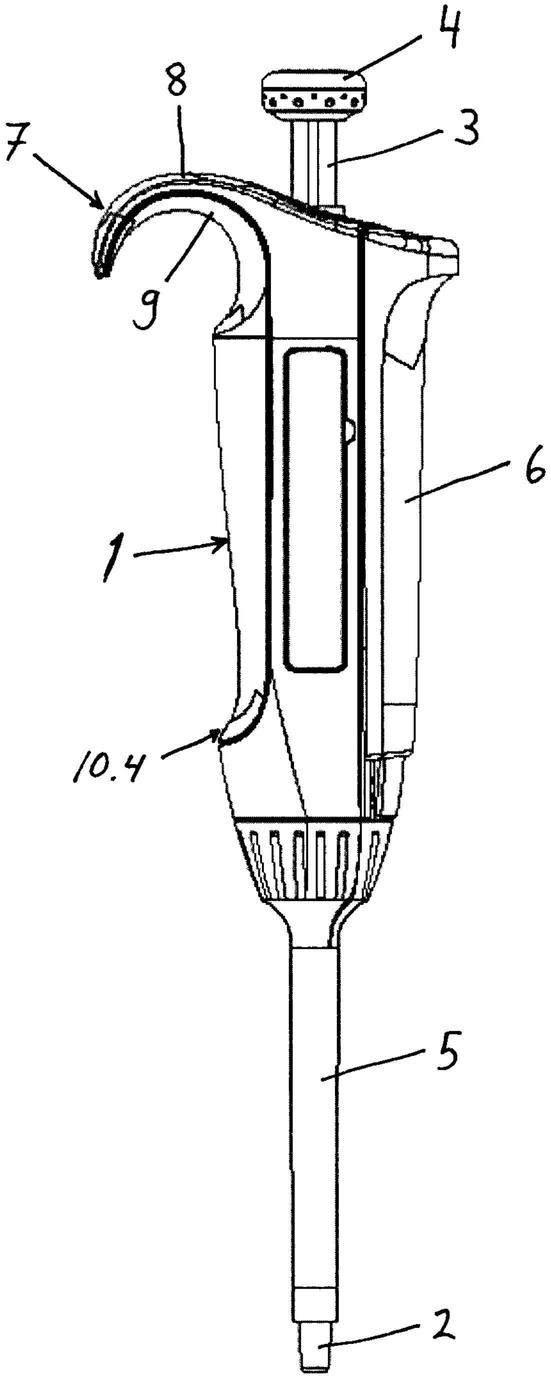
FIG. 4 illustrates a pipette with a fixed lower support according to another preferred embodiment of the invention.

FIG. 4 illustrates an alternative embodiment for the supported pipette according to the invention, where the lower support 10.4 is formed as a simple protrusion of the lower edge of the handle 1. A lower support 10.4 according to the embodiment illustrated in FIG. 4 is easier to manufacture than the hook-like supports illustrated in FIGS. 1-3. A lower support 10.4 according to FIG. 4 is advantageously protruded from the surface level of the pipette handle for about 3-8 mm. Moreover, the surface set against the user's finger is advantageously provided with a grip-improving surface material, which advantageously corresponds to the surface material of the handle 1.

Figure 5:
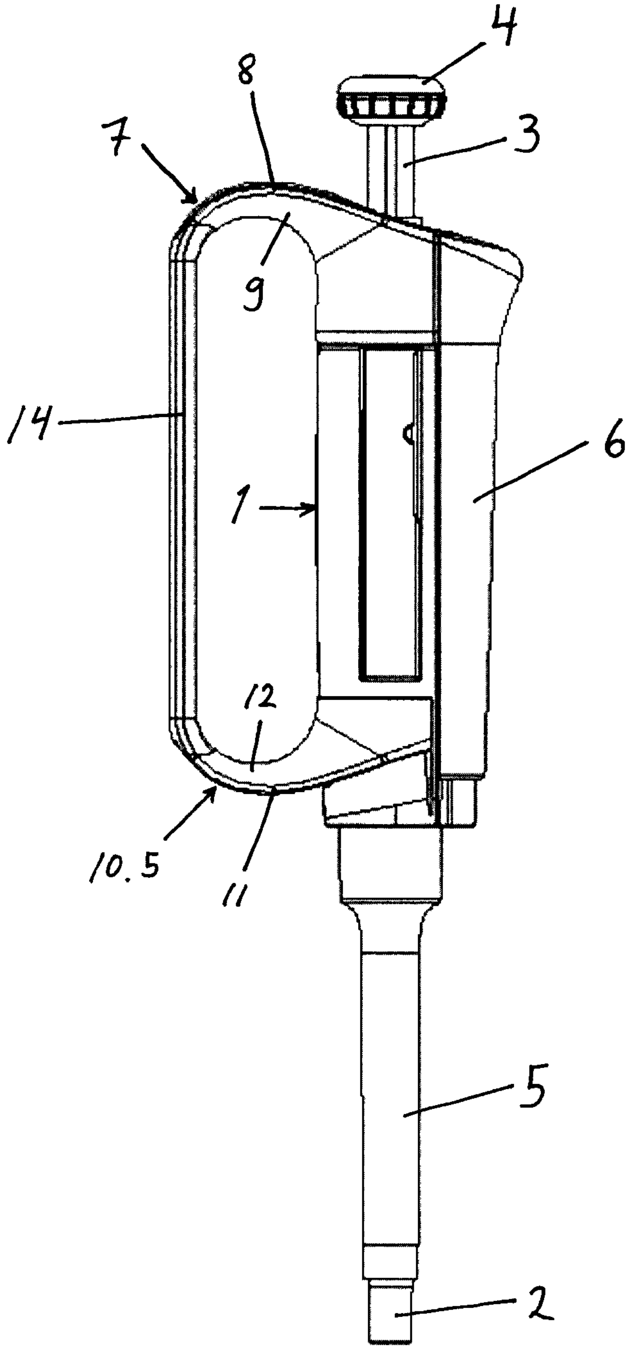
FIG. 5 illustrates a pipette with an alternative support arrangement according to the invention.

In addition to the lower support 10.5 conforming to the shape illustrated in FIGS. 1-3, the pipette illustrated in FIG. 5 includes a support section 14 that connects the outer end of the lower support to the outer end of the finger support 7. Said support section 14 connecting the lower support 10.5 to the finger support 7 helps to obtain in the pipette a finger support structure that is closed in cross-section, which further reduces the strain on the hand, caused by the use of the pipette. The support section 14 can be realized as a rigid element, in which case it is advantageously formed as an extension of the rigid body part 8 of the finger support, which at the other end is connected to the rigid body part 11 of the lower support 10.5. As an alternative, the body part 14 can also be realized as an elastic element made of a suitable material.

The invention claimed is:

1. A support pipette comprising:

At least one cylinder with an upper end and a lower end, each cylinder having a movable piston, and An elongate handle having an upper part and a lower part which are separated from one another along a lengthwise direction of the handle to define a gripping space therebetween to thereby allow the pipette to be manually gripped by a user, wherein The upper part of the handle includes an upper support to support an upper finger of the user when the handle is manually gripped in the gripping space, wherein The lower part of the handle includes a lower support protruding sideways outwardly from the handle to support a palm or lower finger of the user when the handle is manually gripped by the user in the gripping space, and wherein the lower support is rotationally adjustable with respect to an elongate axis of the handle so that the lower support is capable of being angularly oriented with respect to the upper support.

2. A pipette according to claim 1, wherein the lower support protrudes radially sideways with respect to a center axis of the pipette only on part of a cross-sectional area of the pipette.

3. A pipette according to claim 1, wherein the lower support extends for 3-8 mm from a surface level of the handle.

4. A pipette according to claim 1, wherein the lower support and the upper support are opposed to one another.

5. A pipette according to claim 1, wherein the lower support is vertically movable.

6. A pipette according to claim 1, which further comprises a support section connecting an outer end of the upper support and an outer end of the lower support.

7. A pipette according to claim 1, wherein the lower support is longitudinally adjustable along the lengthwise direction of the handle to thereby allow adjustment of the gripping space defined between the upper and lower supports.

8. A pipette according to claim 1, wherein the upper support is downwardly curved.

9. A pipette according to claim 8, wherein the lower support is upwardly curved.

10. A pipette according to claim 1, wherein the lower support is upwardly curved.

* * * * *